United States Patent
Wu

(10) Patent No.: US 8,570,882 B2
(45) Date of Patent: Oct. 29, 2013

(54) METHOD AND DEVICE FOR POWER CONTROL IN HSDPA

(75) Inventor: Song Wu, Beijing (CN)

(73) Assignee: Da Tang Mobile Communications Equipment Co., Ltd, Beijing (CN)

( * ) Notice: Subject to any disclaimer, the term of this patent is extended or adjusted under 35 U.S.C. 154(b) by 493 days.

(21) Appl. No.: 12/374,823

(22) PCT Filed: Jul. 10, 2007

(86) PCT No.: PCT/CN2007/070261
§ 371 (c)(1),
(2), (4) Date: Jan. 23, 2009

(87) PCT Pub. No.: WO2008/014703
PCT Pub. Date: Feb. 7, 2008

(65) Prior Publication Data
US 2010/0002596 A1    Jan. 7, 2010

(30) Foreign Application Priority Data

Jul. 24, 2006    (CN) .......................... 2006 1 0088895

(51) Int. Cl.
*H04L 1/00* (2006.01)
*H04L 12/28* (2006.01)

(52) U.S. Cl.
USPC ............................. 370/252; 370/328; 370/465

(58) Field of Classification Search
None
See application file for complete search history.

(56) References Cited

U.S. PATENT DOCUMENTS

| 7,333,546 | B2* | 2/2008 | Kim et al. | 375/242 |
| 7,352,709 | B2* | 4/2008 | Wakabayashi | 370/278 |
| 7,620,370 | B2* | 11/2009 | Barak et al. | 455/67.13 |
| 7,634,289 | B2* | 12/2009 | Gervais et al. | 455/522 |
| 7,653,409 | B2* | 1/2010 | Inaba | 455/522 |
| 2003/0039217 | A1* | 2/2003 | Seo et al. | 370/318 |
| 2004/0166888 | A1* | 8/2004 | Ahn et al. | 455/522 |

(Continued)

FOREIGN PATENT DOCUMENTS

| CN | 1650547 | 8/2005 |
| CN | 1708149 | 12/2005 |
| CN | 1728582 | 2/2006 |
| CN | 1750428 | 3/2006 |
| CN | 1773884 | 5/2006 |

(Continued)

OTHER PUBLICATIONS

Ghosh, Control Channel Design for High Speed Downlink Shared Channel for 3GPP-WCDMA, REl-5, 2003, IEEE.*

*Primary Examiner* — Kevin C Harper
*Assistant Examiner* — Samina Choudhry
(74) *Attorney, Agent, or Firm* — Occhiuti Rohlicek & Tsao LLP

(57) ABSTRACT

The method for power control in HSDPA includes Step A, the UE with the highest priority and having data to be transmitted is selected according to the algorithm, the channel resource is distributed to the UE, and the original power level is set. Step B, the transmission power is deduced when the channel quality meets the condition; Otherwise the CQI is checked, if the value of CQI is under the highest rate level, or the data is the re-transmitting data, the transmission power is increased, or the power is kept the same level. Step C, channel resource and the UE with the highest priority are checked, if there exist, then go to step B, otherwise the method is ended. So the redundant power can be used when several UEs are controlled at the same time, the efficiency and the throughput performance are improved, and the interface is reduced. The device for power controlling is given at the same time.

8 Claims, 5 Drawing Sheets

(56) References Cited

U.S. PATENT DOCUMENTS

| | | |
|---|---|---|
| 2004/0179493 A1 | 9/2004 | Khan |
| 2005/0220116 A1* | 10/2005 | Ahn et al. .................. 370/395.4 |
| 2006/0135193 A1 | 6/2006 | Ratasuk et al. |
| 2006/0146756 A1* | 7/2006 | Wang et al. .................. 370/335 |
| 2007/0274343 A1* | 11/2007 | Nishio .......................... 370/479 |
| 2008/0039145 A1* | 2/2008 | Ishii et al. ..................... 455/561 |

FOREIGN PATENT DOCUMENTS

| | | |
|---|---|---|
| EP | 1519496 | 3/2005 |
| JP | 2000-78077 | 3/2000 |
| JP | 2001-144680 | 5/2001 |
| JP | 2006-86716 | 3/2006 |
| WO | 2004/102828 | 11/2004 |
| WO | WO2006/041181 | 4/2006 |
| WO | WO2006/065182 | 6/2006 |

* cited by examiner

METHOD AND DEVICE FOR POWER CONTROL IN HSDPA

CROSS-REFERENCE TO RELATED APPLICATIONS

This application is the National Stage of International Application No. PCT/CN2007/070261 filed Jul. 10, 2007, which claims the priority of Chinese Application No. 200610088895.4, filed on Jul. 24, 2006. The contents of both applications are hereby incorporated by reference in their entirety.

FIELD OF THE INVENTION

The present invention relates to the field of telecommunications, and particularly to a method and device for power control in High Speed Downlink Packet Access (HSDPA).

BACKGROUND OF THE INVENTION

Currently, the deployment of HSDPA technologies in Time-Division Synchronization Code Division Multiple Access (TD-SCDMA) and Wideband Code Division Multiple Access (WCDMA) systems has provided a higher data rate, a shorter service response time and improved service reliability.

A transmission channel introduced in the TD-SCDMA and WCDMA HSDPAs is a High Speed Downlink Shared Channel (HS-DSCH), which is used as a bearer of higher layer data from a User Equipment (UE) and corresponds to a physical channel of High Speed Physical Downlink Shared Channel (HS-PDSCH).

The Adaptive Modulation and Coding (AMC) technology deployed in the HSDPA is mainly applied to the HS-DSCH, so that a UE in an advantageous position may be provided with a higher data rate with the combination of the AMC and the Hybrid Automatic Repeat reQuest (HARQ), thereby improving an average throughput of a cell.

Furthermore, with the AMC modulation scheme without changing the transmission power, the transmission power of a Base Station is sufficiently utilized. When a channel for a UE is of a relatively high quality, higher order modulation and a higher coding rate are used at a network side and the UE is assigned with a higher data rate; and when the channel for the UE is degraded, lower order modulation and a lower coding rate are used at the network side and the UE is assigned with a lower data rate.

However, no power control is performed in the HS-DSCH of the prior art. When the transmission power of the Base Station is excessively high and exceeds a dynamic range of a receiver in the UE, the receiver in the UE may be saturated, so that the receiving performance is degraded. Furthermore, when the channel for the UE has a high quality and the transmission in the HS-DSCH is at the predetermined power, the Signal-to-Noise Ratio (SNR) may be higher than that required for the highest transmission rate of the UE, thus, system interference is increased, throughput of the cell is decreased and the power is wasted.

SUMMARY OF THE INVENTION

An aspect of the present invention is to provide a method and device for power control in HSDPA, thereby improving performance of a receiver, decreasing intra-cell and inter-cell interference, improving throughput in a cell and reducing power waste.

Another aspect of the present invention is to provide a method for power control in HSDPA, thereby efficiently assigning excessive power in the case of a plurality of UEs under scheduling, to improve power utilization, lower system interference and improve system throughput.

The solutions in the present invention include the following.

A method for power control in HSDPA is provided, including:

determining whether environment of a channel for a UE is favorable, and if the environment of the channel is favorable, decreasing transmission power; otherwise, monitoring a Channel Quality Indicator (CQI) returned by the UE, increasing the transmission power if the Channel Quality Indicator is lower than the highest rate level supported by the UE or data for retransmission is sent, and maintaining the transmission power unchanged if the Channel Quality Indicator is equal to the highest rate level supported by the UE and new data is sent.

Preferably, it is determined that the environment of the channel for the UE is favorable if one or more of the following cases is met:

a case where the Channel Quality Indicator returned uplink is received by a Base Station, and is always maintained at the highest rate level supported by the UE within a statistic period;

a case where a Transmit Power Control (TPC) command word sent by the UE through an uplink Dedicated Physical Channel (DPCH) is detected by the Base Station, and the TPC command word always instructs the Base Station to decrease the transmission power within a statistic period; and a case where the uplink Dedicated Physical Channel or control channel is measured, and the SNR of the uplink channel is always higher than a target SNR of the channel within a statistic period.

Preferably, the transmission power is adjusted step by step by a predefined power control step.

Preferably, the transmission power is increased without exceeding the predefined maximum transmission power.

A method for power control in HSDPA is provided, including:

A: selecting a UE with the highest priority which desires to transmit data according to a scheduling algorithm, assigning a code channel to the UE and setting an initial transmission power value;

B: determining whether environment of the channel for the UE is favorable; if the environment of the channel is favorable, decreasing transmission power; otherwise, monitoring a Channel Quality Indicator returned by the UE, and then increasing the transmission power if the Channel Quality Indicator is lower than the highest rate level supported by the UE or data for retransmission is sent, and maintaining the transmission power unchanged if the Channel Quality Indicator is equal to the highest rate level supported by the UE and new data is sent; and C: determining whether an available code channel remains and a UE with the second highest priority exists, and if the available code channel remains and the UE with the second highest priority exists, assigning a code channel for the UE with the second highest priority, using previous transmission power of the code channel as the initial transmission power value and returning to step B; otherwise, ending.

Preferably, it is determined that the environment of the channel for the UE is favorable if one or more of the following cases is met:

a case where the Channel Quality Indicator returned uplink is received by a Base Station, and is always maintained at the highest rate level supported by the UE within a statistic period;

a case where a TPC command word sent by the UE through an uplink Dedicated Physical Channel is detected by the Base Station, and the TPC command word always instructs the Base Station to decrease the transmission power within a statistic period; and a case where the uplink Dedicated Physical Channel or control channel is measured, and the SNR of the uplink channel is always higher than a target SNR of the channel within a statistic period.

Preferably, the transmission power is adjusted step by step by a predefined power control step.

Preferably, the transmission power is increased without exceeding the predefined maximum transmission power.

The present invention further provides a device for power control in HSDPA, including:

a signal receiving and demodulating unit, adapted to detect and demodulate an uplink signal on a basis of a UE and a code channel, send the demodulated HS-DSCH data to a channel decoding unit, measure the uplink channel and send a measured SNR and a transmission TPC command word extracted from a downlink shared channel to a modulating and sending unit as the measured information;

the channel decoding unit, adapted to decode the HS-DSCH data to extract a Channel Quality Indicator and response information returned from the UE, and send the extracted Channel Quality Indicator and response information to a data scheduling unit;

the data scheduling unit, adapted to manage priority of the UE and schedule the UE, assign a code channel to the UE, determine transmission power of the code channel, and send the HS-DSCH data and the related control information to a channel coding unit;

the channel coding unit, adapted to code and map the HS-DSCH data to a physical channel, code the control information related to the HS-DSCH data, and send the coded and mapped data to the modulating and sending unit; and the modulating and sending unit, adapted to modulate the data coded and mapped by the channel coding unit, perform power control with the measured information from the signal receiving and demodulating unit, and send out the power corresponding to each code channel, that is sent by the data scheduling unit, for further processing.

The signal receiving and demodulating unit is further adapted to measure the SNR of the uplink channel, and send the measured SNR and the transmission TPC command word extracted from the downlink shared channel to the data scheduling unit as the measured information. The data scheduling unit is further adapted to assist the scheduling and the HS-DSCH power control according to the received measured information.

In comparison with the prior art, the solutions provided in the present invention have the following technical benefits.

In the data communication of the UE using the HSDPA, the HS-DSCH power is controlled in real time with the technical solutions provided in the present invention, and the downlink data is always sent at appropriate power by monitoring and feeding back the conditions of the channel environment of the UE, so that the power waste and the interference in the cell is reduced.

Furthermore, the present invention discloses that the power in the channel environment of the UE may be decreased in the case where the Channel Quality Indicator returned uplink and received by the Base Station is always maintained at the highest rate level supported by the UE, in the case where a TPC command word sent by the UE through an uplink Dedicated Physical Channel and detected by the Base Station always instructs the Base Station to decrease the transmission power, or in the case where the measured SNR of the uplink Dedicated Physical Channel or control channel is always higher than a target SNR of the channel. In one or more of the cases above, the power in the channel environment can be decreased. With the invention, the transmission power can be adjusted in time according to the conditions of the channel environment.

In addition, the technical solutions in the present invention may be applied to the case of a plurality of UEs under scheduling. After power adjustment is performed for the UE with the highest priority in a scheduling queue, the power adjustment may be performed for the UE with the second highest priority selected from the scheduling queue if available power remains, so that the remained power may be utilized more efficiently, system interference may be reduced, and system throughput may be improved.

The invention is further described below in connection with the drawings and embodiments.

DETAILED DESCRIPTION OF THE INVENTION

With the present invention, the HS-DSCH power is controlled dynamically so that downlink data is always sent at appropriate power, thereby reducing the power waste and the interference in the cell, and improving the throughput of the cell. The invention is described in detail below in connection with the drawings and embodiments.

Figure 1:
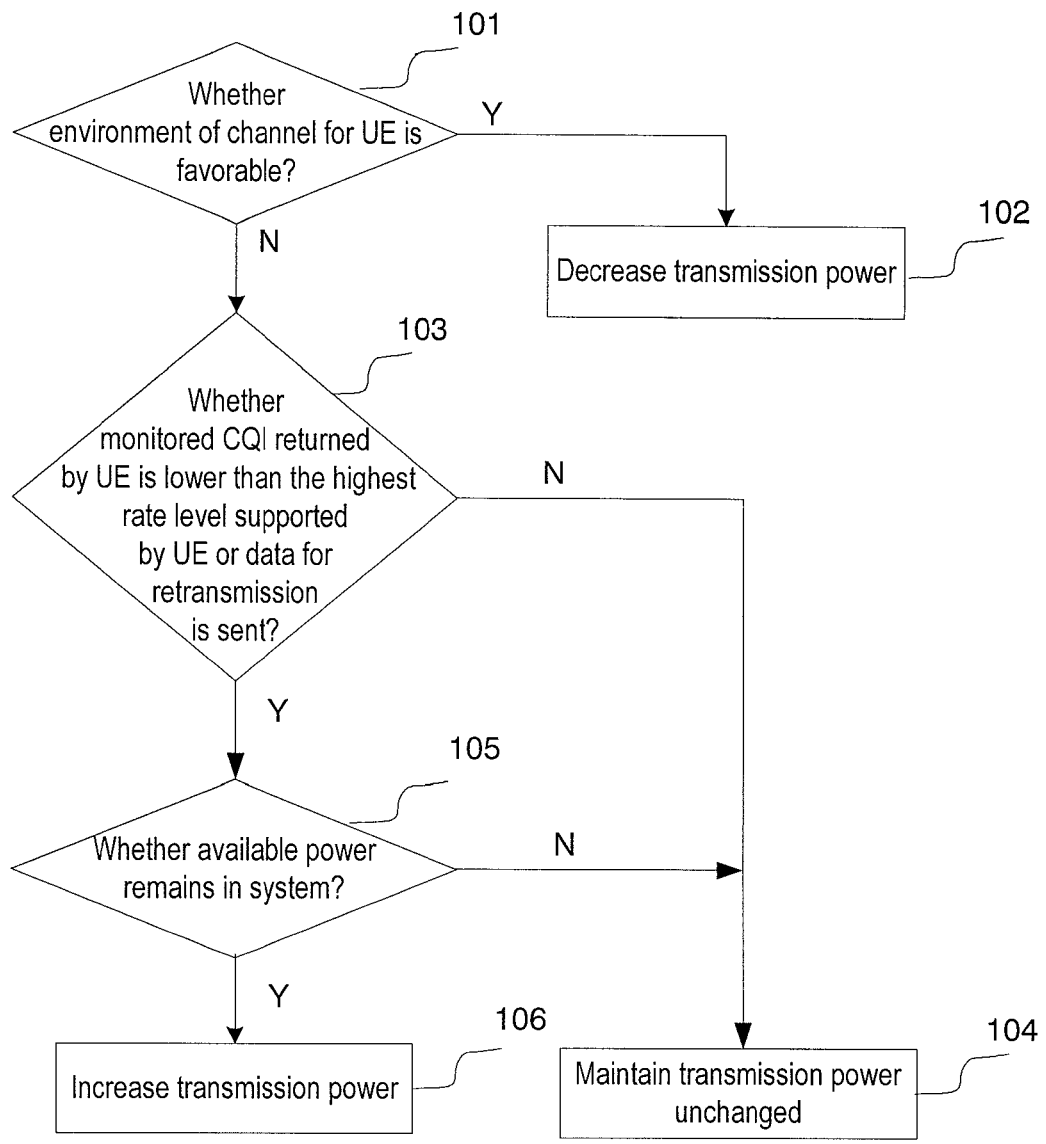
FIG. 1 is a flow chart illustrating control and adjustment on transmission power in an HS-DSCH according to an embodiment of the present invention.

A procedure of control and adjustment performed on transmission power of an HS-DSCH for one UE under scheduling is shown in FIG. 1, and the procedure includes the following.

Step 101: It is determined whether channel environment of the UE is favorable, and step 102 is carried out if the channel environment is favorable; otherwise, step 103 is carried out.

Step 102: The transmission power is decreased.

Step 103: A CQI returned by the UE is monitored, step 105 is carried out if the CQI is lower than the highest rate level supported by the UE or data for retransmission is sent, and step 104 is carried out if the CQI is equal to the highest rate level supported by the UE and new data is sent.

Step 104: The transmission power is maintained unchanged.

Step 105: It is determined whether available power remains in the system, and step 106 is carried out if the available power remains; otherwise, step 104 is carried out.

Step 106: The transmission power is increased.

At step 101, the channel environment of the UE is determined as favorable in one or more of the following cases.

Case 1: The CQI and an ACK/NACK that are returned uplink by the UE are received by a Base Station. If the CQI is always maintained at the highest rate level supported by the UE and ACKs are returned by the UE within a statistic period, the channel environment has a high quality and the transmission power may be decreased.

According to definition in the existing protocols in HSDPA, UEs are categorized based on their capabilities. In a TD-SCDMA system, fifteen categories of UEs are defined according to the highest rates supported by the UEs and sizes of internal buffers in the UEs. Various transmission block sizes corresponding to the respective transmission rate levels are defined in each category of UEs. The highest rate level of a UE means the highest service rate supported by the UE.

When accessing a network and applying for an HSDPA service, the UE reports its capability level to the network. An appropriate data volume for transmission may be selected in the scheduling at the network side according to the capability level of the UE. In the scheduling at a Base Station side in HSDPA, a primary reference is a CQI returned by the UE, which is obtained by the UE through measurement of the downlink channel. Generally, the SNR of the downlink channel for receiving downlink data may be measured directly. A mapping relationship between the reported CQI value and the transmission rate may be obtained through algorithmic conversion, because each SNR corresponds to a different transmission rate and a modulating mode. After the reported CQI value returned by the UE is received at the network side, a corresponding transmission rate (i.e. the size of a transmission block) recommended by the UE may be obtained.

Within a certain statistic period, a statistic threshold is denoted as an integer T larger than 0, and the power in an HS-DSCH for a UE is decreased only if the HS-DSCH meets the power decreasing conditions for T times. Further, the times for which the HS-DSCH for the UE meets the power decreasing conditions is denoted as a variable m, which has an initial value of 0 and is added by 1 each time the power decreasing conditions are met. However, m is reset as 0 once the power decreasing conditions are not met. When m is equal to T, the transmission power of the HS-DSCH for the UE is decreased once.

Case 2: The Base Station continuously detects a TPC command word from an uplink DPCH that is sent by the UE. If the TPC command word continuously instructs the Base Station to decrease the transmission power within a statistic period, it is meant that the channel environment for the UE has a high quality and the UE may be approaching the Base Station, and the transmission power of the HS-DSCH may be lowered according to the power control on the DPCH.

During the communication between the UE and the network, downlink power control and uplink power control may be performed in the system to ensure air interface communication quality and ensure that receiving SNRs of the uplink and downlink links are close to the target SNRs. In the downlink power control, the UE receives downlink data and measures the downlink link, compares a measured result with the target SNR, and then generates a downlink TPC command word to control the Base Station to increase or decrease the downlink transmission power. Particularly, when the SNR of the receiving signal measured by the UE is higher than the target SNR, the UE generates a TPC command word of decreasing the transmission power to instruct the Base Station to decrease the transmission power by the predefined power control step; and when the SNR of the receiving signal measured by the UE is lower than the target SNR, the UE generates a TPC command word of increasing the transmission power to instruct the Base Station to increase the transmission power by the predefined power control step. Accordingly in the invention, it is indicated that the environment of the downlink channel has a sufficiently high quality if all the TPC command words received by the Base Station instruct the Base Station to decrease the transmission power, and the SNR required for the service can be achieved with a lower transmission power.

Similar to case 1, within a certain statistic period, a statistic threshold is denoted as an integer T larger than 0, and the power in an HS-DSCH for a UE is decreased only if the HS-DSCH meets the power decreasing conditions for T times. Further, the times for which the HS-DSCH for the UE meets the power decreasing conditions is denoted as a variable m, which has an initial value of 0 and is added by 1 each time the power decreasing conditions are met. However, m is reset as 0 once the power decreasing conditions are not met. When m is equal to T, the transmission power of the HS-DSCH for the UE is decreased once.

Case 3: The uplink DPCH or control channel for the UE is measured. Within a certain statistic period, it is indicated that the environment of the channel for the UE has a high quality if the SNRs of the channel are higher than target SNR of the channel, and the transmission power of the HS-DSCH may be lowered. The SNR comparison and the statistic period are same as those in case 2 and are not described.

Further, the statistic period in the invention, which is not a constant value, is determined based on simulations and measurements, taking algorithm performance into consideration. In practice, the power control is performed in each sub-frame. The power control result according to a TPC command word based on only one sub-frame may be inaccurate due to frequent changes in the channel environment, and therefore a regressive average method is generally used in the power control algorithm. In other words, the next power control operation of increasing or decreasing the transmission power is determined from a TPC command word based on a plurality of sub-frames. For example, given that the statistic period is eight sub-frames, when a TPC command word to decrease the transmission power is received from the UE for successive eight sub-frames, it is indicated that the environment of the channel for the UE has a very high quality and transmission power of the corresponding HS-DSCH may be decreased.

At step 102 or 106 above, when it is determined to decrease or increase the transmission power of the HS-DSCH for the UE, the transmission power may be decreased or increased by the predefined power control step. The transmission power is not increased if the remaining power is not sufficient to increase the transmission power by one power control step. That is, the increased transmission power cannot exceed the predefined maximum transmission power of the HS-DSCH in the system.

Figure 2:
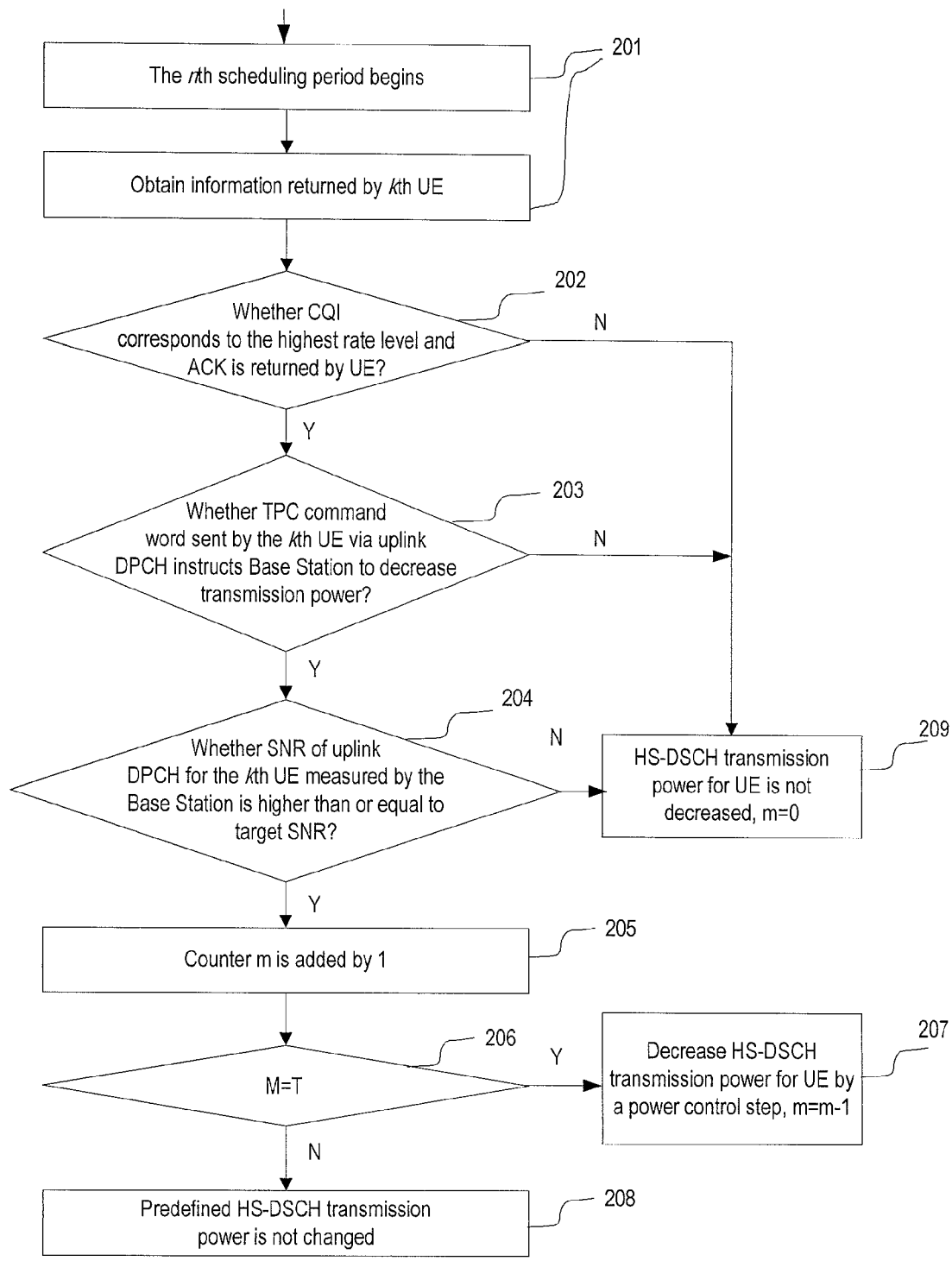
FIG. 2 is a flow chart illustrating control and adjustment on transmission power in an HS-DSCH of one UE according to an embodiment of the present invention.

The method above is described in detail below through an embodiment of the present invention. FIG. 2 shows a procedure of determining whether the HS-DSCH transmission power for a UE meets adjustment conditions during scheduling of the UE, and the procedure includes the following.

Step 201: Information of CQI and NACK/ACK returned from the kth UE is obtained at the beginning of the nth scheduling period.

Step 202: According to the CQI returned by the kth UE and the capability level of the UE, a rate level corresponding to the CQI is obtained from a lookup table. Further, it is determined whether the CQI corresponds to the highest rate level supported by the kth UE and whether NACK or ACK is returned by the UE, and if the CQI corresponds to the highest rate level supported by the kth UE and ACK is returned by the kth UE, step 203 is carried out subsequently; otherwise, step 209 is carried out subsequently.

Step 203: It is determined whether a TPC command word sent by the kth UE via an uplink DPCH instructs the Base Station to decrease transmission power. If the TPC command word instructs the Base Station to decrease the transmission power of the downlink DPCH, step 204 is carried out subsequently; otherwise, step 209 is carried out subsequently.

Step 204: It is determined whether an SNR of the uplink DPCH for the kth UE that is measured by the Base Station is higher than or equal to a target SNR. If the measured receiving SNR of the uplink DPCH for the kth UE is higher than or equal to the target SNR, step 205 is carried out subsequently; otherwise, step 209 is carried out subsequently.

Step 205: HS-DSCH power decreasing conditions are met, and the times m for which the UE successively meets the HS-DSCH power decreasing conditions is added by 1.

Step 206: It is determined whether m is equal to T (which is an integer larger than 0 and denotes a threshold, and the power in an HS-DSCH for a UE is decreased only if the HS-DSCH meets the power decreasing conditions for T times). If m is equal to T, step 207 is carried out subsequently; otherwise, step 208 is carried out subsequently.

Step 207: The transmission power of the HS-DSCH is decreased by one power control step, and m is decreased by 1.

Step 208: The predefined transmission power of the HS-DSCH is not changed.

Step 209: The transmission power of the HS-DSCH is not decreased and m is reset as 0.

It is noted that once the UE receives data previously sent by the Base Station, the UE decodes the received data and returns an NACK or ACK to the network side depending whether the data is decoded correctly or not. If the data is decoded correctly, an ACK is returned, otherwise an NACK is returned. If an ACK is returned by the UE, it is indicated that the channel environment in which the data is previously sent has a high quality or the UE decoded correctly the data by combining retransmitted data, consequently, the Base Station may schedule new data to be sent subsequently. If an NACK is returned by the UE, it is indicated that the channel environment in which the data is previously sent has a low quality and the data is not decoded correctly by the UE, in this case, the Base Station determined whether the maximum retransmission times is reached, and retransmits the data continuously if the maximum retransmission times is not been reached. Therefore, the determination of whether the NACK or ACK is returned by the UE is to assist in determining whether the channel environment has a high quality or not. If the UE always returns an NACK, it is indicated that the channel has a low quality and a low SNR, thus the transmission power needs to be increased, instead of being decreased.

Figure 3:
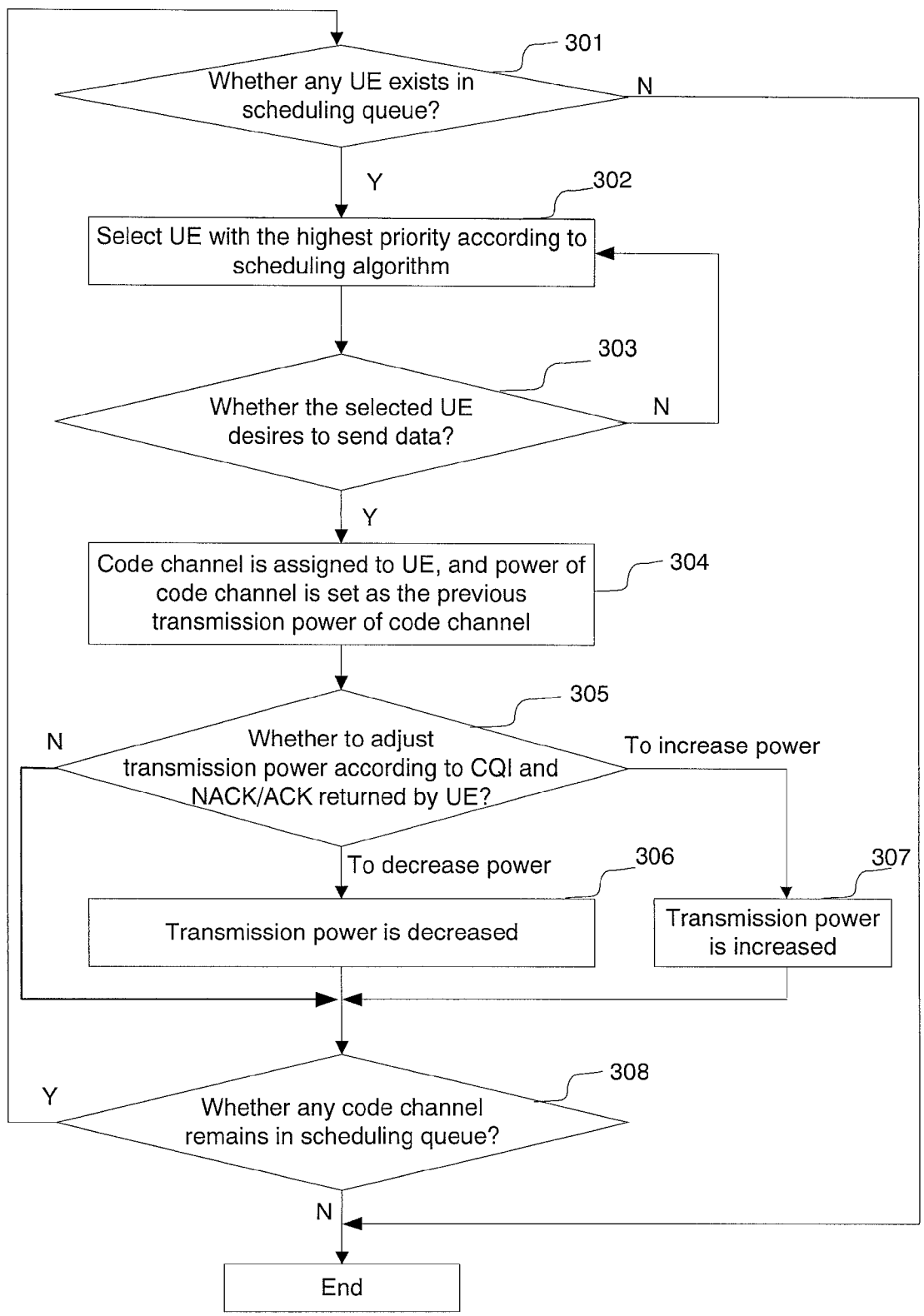
FIG. 3 is a flow chart illustrating transmission power control and adjustment for a plurality of UEs according to an embodiment of the present invention.

In the case of a plurality of UEs under scheduling, the power control and assignation procedure in which remaining power is assigned to UEs other than the UE on which the power adjustment has been performed using the method according to the present invention is shown in FIG. 3, and the procedure includes the following.

Step 301: It is determined whether a UE exists in a scheduling queue, and if the UE exists in the scheduling queue, step 302 is carried out subsequently; otherwise, the procedure is ended.

Step 302: A UE with the highest priority is selected from the scheduling queue according to a scheduling algorithm.

Step 303: It is determined whether the selected UE is to send data. If the selected UE is to send data, step 304 is carried out subsequently; otherwise the scheduling queue is updated to remove the selected UE from the scheduling queue. Subsequently, it is determined whether any more UE exists in the scheduling queue, and if no more UE exists in the scheduling queue, the procedure is ended; otherwise, step 302 is carried out.

Step 304: If the UE with the highest priority is to send data, the related code channel is assigned to the UE. The power of the code channel is set as the previous transmission power of the code channel.

Step 305: It is determined whether to adjust the transmission power according to the CQI and NACK/ACK returned by the UE. Step 308 is carried out subsequently if the transmission power needs no adjustment, step 306 is carried out subsequently if the transmission power needs to be decreased, and step 307 is carried out subsequently if the transmission power needs to be increased.

Step 306: The transmission power is decreased. That is, the power of the code channel is decreased by a predefined step, and step 308 is carried out subsequently.

Step 307: The transmission power is increased. That is, the power of the code channel is increase by the predefined step, without exceeding the maximum power of the code channel. Furthermore, if a plurality of code channels are occupied by the UE, all of the plurality of code channels are adjusted in the same way, and step 308 is carried out subsequently.

Step 308: The scheduling queue is updated to remove the scheduled UE from the scheduling queue, and it is determined whether any code channel remains in the scheduling queue. If a code channel remains, step 301 is carried out subsequently; otherwise, the procedure is ended.

At step 305 above, the determination of whether power decreasing conditions are met is similar to the above determination of whether the channel environment for the UE meets conditions and therefore is not described hereinafter.

Figure 4:
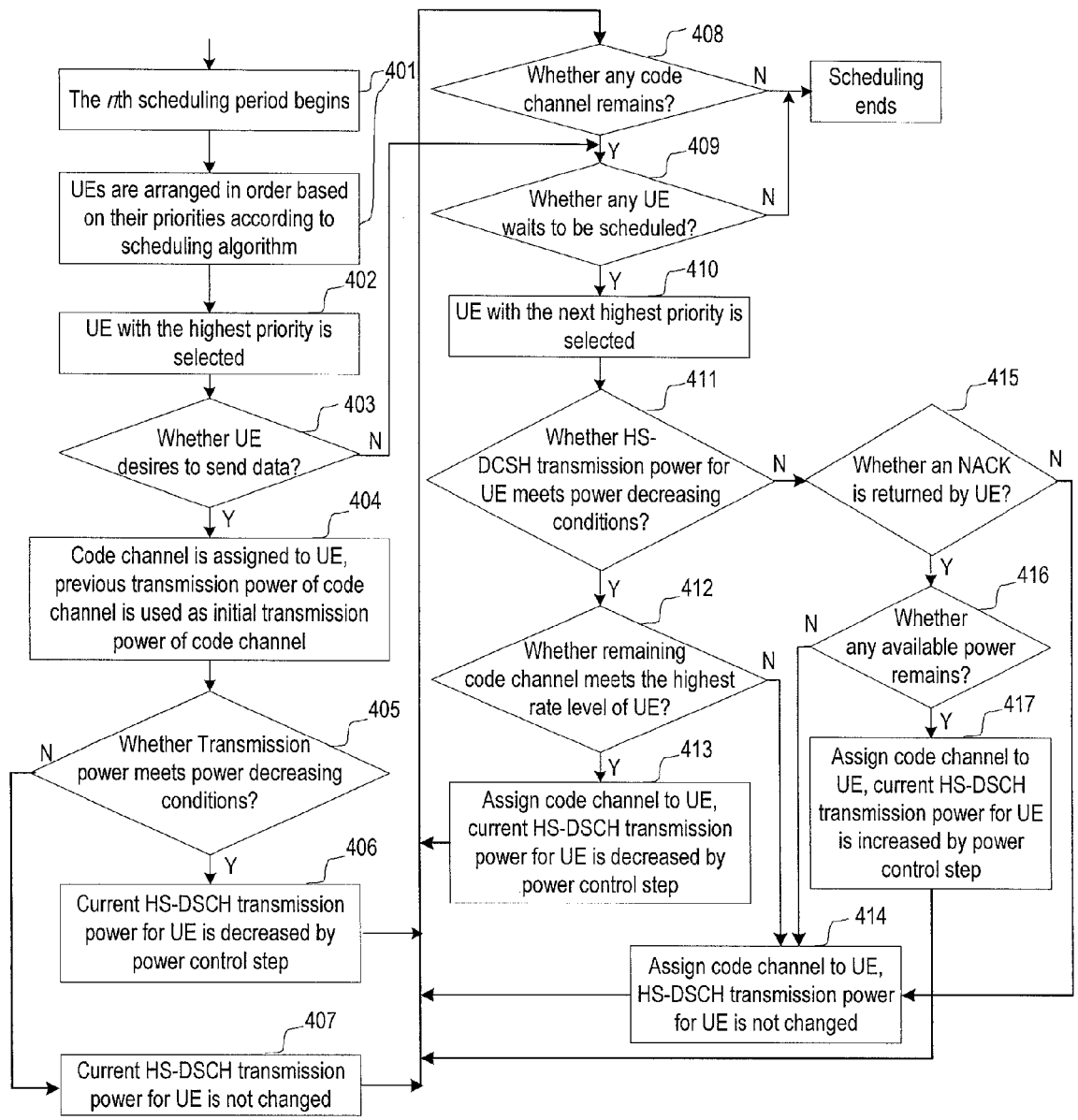
FIG. 4 is a flow chart illustrating control and adjustment on transmission power in HS-DSCHs of a plurality of UEs according to an embodiment of the present invention.

The above method is described in detail below through an embodiment of the present invention. FIG. 4 shows a procedure of adjusting HS-DSCH transmission power for a plurality of UEs during scheduling of the UEs according to an embodiment of the present invention, and the procedure includes the following.

Step 401: A plurality of UEs are arranged in order based on their priorities according to a scheduling algorithm at the beginning of the nth scheduling period.

Step 402: A UE with the highest priority is selected from the scheduling queue.

Step 403: It is determined whether the selected UE is to send data. If the selected UE is to send data, step 404 is carried out subsequently; otherwise, step 409 is carried out subsequently.

Step 404: A code channel is assigned to the UE, and the previous transmission power of the code channel is used as the initial transmission power of the code channel.

Step 405: It is determined whether the transmission power of the HS-DCSH for the UE meets power decreasing conditions. If the transmission power of the HS-DCSH for the UE meets the power decreasing conditions, step 406 is carried out subsequently; otherwise, step 407 is carried out.

Step 406: The current HS-DSCH transmission power for the UE is decreased by a power control step, and step 408 is carried out subsequently.

Step 407: The current HS-DSCH transmission power for the UE is not changed, and step 408 is carried out subsequently.

Step 408: It is determined whether any code channel remains. If a code channel remains, step 409 is carried out subsequently; otherwise, the procedure is ended.

Step 409: It is determined whether any UE to be scheduled exists in the scheduling queue. If the UE to be scheduled exists in the scheduling queue, step 410 is carried out subsequently; otherwise, the procedure is ended.

Step 410: A UE with the next highest priority is selected.

Step 411: It is determined whether the HS-DCSH transmission power for the UE meets the power decreasing conditions. If the HS-DCSH transmission power for the UE meets the power decreasing conditions, step 412 is carried out subsequently; otherwise, step 415 is carried out.

Step 412: It is determined whether the remaining code channel meets requirement of the highest rate level of the UE. If the remaining code channel meets the requirement of the highest rate level of the UE, step 413 is carried out subsequently; otherwise, step 414 is carried out.

Step 413: A code channel is assigned to the UE, the HS-DSCH transmission power for the UE is decreased by the power control step, and step 408 is carried out subsequently.

Step 414: A code channel is assigned to the UE, the HS-DSCH transmission power for the UE is not changed, and step 408 is carried out subsequently.

Step 415: It is determined whether an NACK is returned by the UE. If an NACK is returned by the UE, step 416 is carried out subsequently; otherwise, step 414 is carried out.

Step 416: It is determined whether any available power remains. If available power remains, step 417 is carried out subsequently; otherwise, step 414 is carried out subsequently.

Step 417: A code channel is assigned to the UE, the HS-DSCH transmission power for the UE is increased by the power control step, and step 408 is carried out subsequently.

Figure 5:
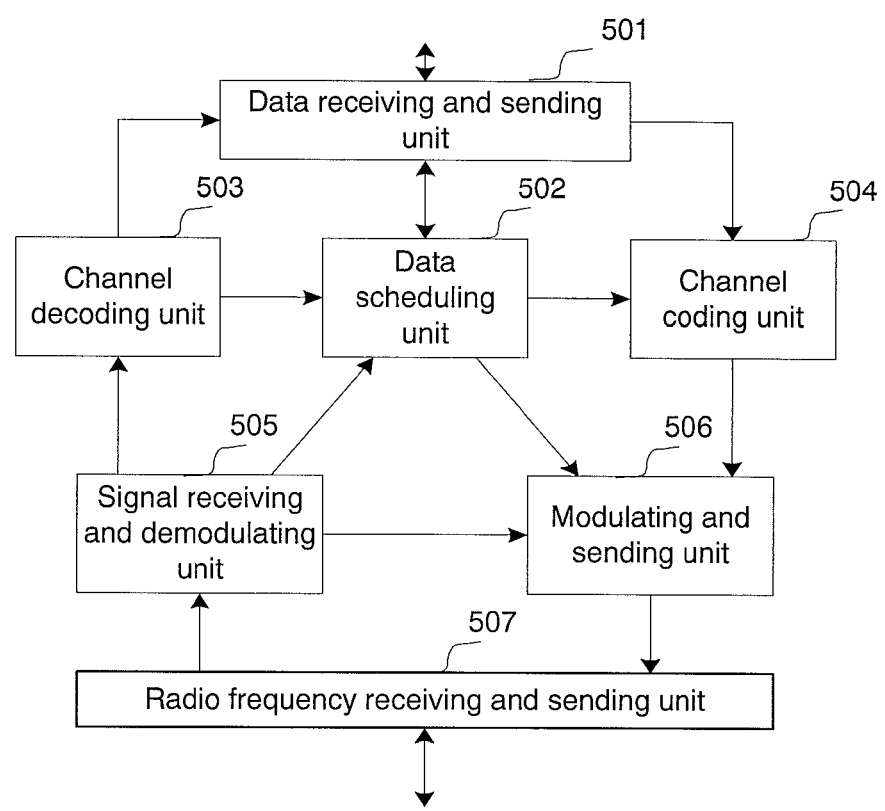
FIG. 5 is a block diagram of the device for transmission power control in an HS-DSCH according to an embodiment of the present invention.

With reference to FIG. 5, the device for controlling HS-DSCH transmission power according to an embodiment of the present invention is described in detail below. The device includes a data receiving and sending unit 501, a data scheduling unit 502, a channel decoding unit 503, a channel coding unit 504, a signal receiving and demodulating unit 505, a modulating and sending unit 506 and a radio frequency receiving and sending unit 507.

The data receiving and sending unit 501 receives and sends data frames and control frames in Iub FP protocol. In the downlink direction, the data receiving and sending unit 501 receives Forward Access Channel (FACH), Paging Channel (PCH), Dedicated Channel (DCH) and HS-DSCH data frames which are sent by a Radio Network Controller (RNC) via an Iub interface, sends the FACH, PCH and DCH data frames to the channel coding unit 504, and sends the HS-DSCH data frame to the data scheduling unit 502. In the uplink direction, the data receiving and sending unit 501 sends the RACH and DCH data frames received in the uplink direction to the RNC via the Iub interface.

Further, the data receiving and sending unit 501 functions to synchronize the Iub interface transmission channel and the node, receive and send control frames related to the HSDPA and assist the data scheduling unit 502 in traffic control at the HSDPA Iub interface.

The data scheduling unit 502, which plays a role of a MAC-hs entity in HSDPA, functions to manage a UE priority queue, schedule a plurality of UEs and perform an HARQ function. Scheduling of a plurality of UEs includes selecting a UE under scheduling and the UE priority queue, assigning a code channel, determining amount of data under scheduling, a modulating mode and a code rate, and determining transmission power of the code channel. After scheduling the UE, the data scheduling unit 502 may determine whether the data sent is for retransmission or new, determine the number of the assigned HS-PDSCH code channels, and a power value, a modulation mode and a code rate of each code channel, send the data to be sent and control information related to the data, such as the code rate, the modulation mode and HS-PDSCH code channel information, to the channel coding unit 504, and send parameter of transmission power of each code channel to the modulating and sending unit 506.

Further, the data scheduling unit 502 receives HS-DSCH data from the common channel and dedicated channel Iub FP data receiving and sending unit 501, and performs traffic control at Iub through the related control frames. The data scheduling unit 502 receives the CQI and NACK/ACK returned by the UE from the channel decoding unit 503, receives a measurement report on the signal quality in uplink DPCH from the signal receiving and demodulating unit 505 and TPC command word statistic information from the UE, and assists in the scheduling and the HS-DSCH power control.

The channel decoding unit 503 receives uplink high speed shared control channel or high speed dedicated control channel data in the uplink RACH, DPCH and HSDPA from the signal receiving and demodulating unit 505, decodes the RACH and DPCH data, and sends the decoded RACH and DPCH data to the common channel and dedicated channel Iub FP data receiving and sending unit 501. The channel decoding unit 503 further decodes the uplink high speed shared control channel or high speed dedicated control channel to extract and send the CQI and NACK/ACK returned by the UE to the data scheduling unit 502.

The channel coding unit 504 receives the FACH, PCH and DCH data from the common channel and dedicated channel Iub FP data receiving and sending unit 501, and performs processing such as channel coding, interleaving and physical channel mapping on the received FACH, PCH and DCH data. Further, the channel coding unit 504 receives the HS-DSCH data and the related control information from the data scheduling unit 502, performs processing such as coding, interleaving and physical channel mapping on the HS-DSCH data, and multiplexing, coding and mapping the control information related to the HS-DSCH data to the High Speed Downlink Shared Control Channel (HS-SCCH). Subsequently, the channel coding unit 504 sends the coded and mapped data to the modulating and sending unit 506.

The signal receiving and demodulating unit 505 receives data from the radio frequency receiving and sending unit 507, detects and demodulates uplink signals on a basis of UEs and code channels, and sends the demodulated signals to the channel decoding unit 503.

The signal receiving and demodulating unit 505 further measures the uplink channel. For example, the signal receiving and demodulating unit 505 measures an SNR of the uplink channel, and sends the measured SNR and a TPC command word obtained from the DPCH to the data scheduling unit 502. In addition, the measured SNR and the TPC command word are sent to the modulating and sending unit 506, to complete DPCH power control and uplink synchronization control (for a TDD system).

The modulating and sending unit 506 receives, modulates and scrambles data subjected to processing such as coding and physical channel mapping from the channel coding unit 504, receives the measured information from the signal receiving and demodulating unit 505 to perform power control (and uplink synchronization control in the case of a TD-SCDMA), and performs weighting of the data according to the transmission power that is set at a higher level or obtained through the power control in the modulating and sending unit 506. In the case of a TD-SCDMA system, the modulating and sending unit 506 may further perform beamforming of the DPCH data, and the HS-DSCH and HS-SCCH data, and send the resultant data to the radio frequency receiving and sending unit 507.

The radio frequency receiving and sending unit 507 receives a signal in the uplink direction, performs processing such as low-noise amplifying, AD converting and digital down-converting on the received signal, and converts a radio frequency into a baseband signal. In the downlink direction, the radio frequency receiving and sending unit 507 performs processing such as digital up-converting, DA converting and power amplifying on a downlink signal and transmits the processed signal.

The invention is described with, but is not limited to, the preferred embodiments of the invention described above. Various modifications, alternatives and improvements made to the invention without departing from the scope of the invention are indented to be within the scope of the invention defined by the appending claims.

The invention claimed is:

1. A method for power control in High Speed Downlink Packet Access, comprising:
   determining by a data scheduling unit whether environment of a channel for a User Equipment is favorable, and if the environment of the channel is favorable, decreasing transmission power of a High Speed Downlink Shared Channel, wherein in the case that a Transmit Power Control command word sent by the User Equipment through an uplink Dedicated Physical Channel is detected by the Base Station, and the Transmit Power Control command word always instructs the Base Station to decrease the transmission power within a statistic period, the environment of the channel for the User Equipment is determined as favorable;
   otherwise,
      monitoring by the data scheduling unit a Channel Quality Indicator returned by the User Equipment,
      increasing the transmission power of the High Speed Downlink Shared Channel if the Channel Quality Indicator is lower than the highest rate level supported by the User Equipment or data for retransmission is sent, and
      maintaining the transmission power of the High Speed Downlink Shared Channel unchanged if the Channel Quality Indicator is equal to the highest rate level supported by the User Equipment and new data is sent.

2. The method of claim 1, wherein the transmission power is adjusted step by step by a predefined power control step.

3. The method of claim 2, wherein the transmission power is increased without exceeding the predefined maximum transmission power.

4. A method for power control in High Speed Downlink Packet Access, comprising:
   A: selecting by a data scheduling unit a User Equipment with the highest priority which desires to transmit data according to a scheduling algorithm, assigning a code channel to the User Equipment and setting an initial transmission power value;
   B: determining by the data scheduling unit whether environment of the channel for the User Equipment is favorable; if the environment of the channel is favorable, decreasing transmission power of a High Speed Downlink Shared Channel, wherein in the case that a Transmit Power Control command word sent by the User Equipment through an uplink Dedicated Physical Channel is detected by the Base Station, and the Transmit Power Control command word always instructs the Base Station to decrease the transmission power within a statistic period, the environment of the channel for the User Equipment is determined as favorable; otherwise, monitoring by the data scheduling unit a Channel Quality Indicator returned by the User Equipment, and then increasing the transmission power of the High Speed Downlink Shared Channel if the Channel Quality Indicator is lower than the highest rate level supported by the User Equipment or data for retransmission is sent, and maintaining the transmission power of the High Speed Downlink Shared Channel unchanged if the Channel Quality Indicator is equal to the highest rate level supported by the User Equipment and new data is sent; and
   C: determining by the data scheduling unit whether an available code channel remains and a User Equipment with the second highest priority exists; if the available code channel remains and the User Equipment with the second highest priority exists, assigning by the data scheduling unit a code channel for the User Equipment with the second highest priority, using previous transmission power of the code channel as an initial transmission power value and returning to step B; otherwise, ending.

5. The method of claim 4, wherein the transmission power is adjusted step by step by a predefined power control step.

6. The method of claim 5, wherein the transmission power is increased without exceeding the predefined maximum transmission power.

7. A device for power control in High Speed Downlink Packet Access, comprising:
   a signal receiving and demodulating unit, adapted to detect and demodulate an uplink signal on a basis of a User Equipment and a code channel, send the demodulated HS-DSCH data to a channel decoding unit, measure the uplink channel and send a measured Signal-to-Noise Ratio and a transmission Transmit Power Control command word extracted from a downlink shared channel to a modulating and sending unit as the measured information;
   the channel decoding unit, adapted to decode the HS-DSCH data to extract a Channel Quality Indicator and response information returned from the User Equipment, and send the extracted Channel Quality Indicator and response information to a data scheduling unit;
   the data scheduling unit, adapted to manage priority of the User Equipment and schedule the User Equipment, assign a code channel to the User Equipment, determine transmission power of the code channel, and send the HS-DSCH data and the related control information to a channel coding unit, wherein the data scheduling unit determines whether environment of a channel for a User Equipment is favorable, and if the environment of the channel is favorable, decreases transmission power of a High Speed Downlink Shared Channel, and wherein in the case that a Transmit Power Control command word sent by the User Equipment through an uplink Dedicated Physical Channel is detected by the Base Station, and the Transmit Power Control command word always instructs the Base Station to decrease the transmission power within a statistic period, the environment of the channel for the User Equipment is determined as favorable; otherwise, the data scheduling unit monitors a Channel Quality Indicator returned by the User Equipment, increases the transmission power of the High Speed Downlink Shared Channel if the Channel Quality Indicator is lower than the highest rate level supported by the User Equipment or data for retransmission is sent, and maintains the transmission power of the High Speed Downlink Shared Channel unchanged if the Channel Quality Indicator is equal to the highest rate level supported by the User Equipment and new data is sent;

the channel coding unit, adapted to code and map the HS-DSCH data to a physical channel, code the control information related to the HS-DSCH data, and send the coded and mapped data to the modulating and sending unit; and the modulating and sending unit, adapted to modulate the data coded and mapped by the channel coding unit, perform power control with the measured information from the signal receiving and demodulating unit, and send out the power corresponding to each code channel, that is sent by the data scheduling unit, for further processing.

8. The device of claim 7, wherein the signal receiving and demodulating unit is further adapted to measure a Signal-to-Noise Ratio of the uplink channel, and send the measured SNR and the transmission Transmit Power Control command word extracted from the downlink shared channel to the data scheduling unit as the measured information, and the data scheduling unit is further adapted to assist the scheduling and the HS-DSCH power control according to the received measured information.

* * * * *